2,726,210

LUBRICANTS

Marion L. Sharrah, Ponca City, Okla., assignor to Continental Oil Company, Ponca City, Okla., a corporation of Delaware No Drawing. Application October 24, 1951, Serial No. 252,980

8 Claims. (Cl. 252—46.4)

This invention relates to improved lubricating oils especially in application to engine service where it is necessary to protect lubricated parts against corrosive action of degradation products formed in engine operation.

More particularly, my invention relates to the preparation of a new class of compounds produced by the reaction of olefin-nitrosyl halide adducts with a water-soluble inorganic metal sulfide and the double decomposition products thereof; and to lubricating compositions containing such reaction products in the proportions of about 0.5 to 5 per cent. These new compounds in combination with a lubricating oil are unusual in possessing properties both as a corrosion inhibitor and as a high capacity neutralizer of corrosive acids developed in the oil during engine operation.

Therefore, an object of this invention is to improve the properties of lubricating oils. Another object is to improve the high temperature performance and stability of fluid lubricants. Another object is to provide a class of compounds comprising sulfur and nitrogen-containing organic compounds which, when combined with a lubricating base oil stock, will act both as corrosion inhibitors and high capacity acid neutralizers. Other objects are to provide new compositions of matter both as to the inhibitor-neutralizer compounds and to lubricating oils combined with them.

I have discovered that when olefin-nitrosyl chloride adducts are treated with solutions of an alkali metal mono sulfide or polysulfide (herein collectively referred to as sulfides), both condensation and structural rearrangement of the adducts occur producing compounds which are believed to be bis (alkali metal oximido alkyl) sulfides but for which structure I have no specific proof. I found that the products of this reaction possess unusual protective properties in combination with hydrocarbon oils. Furthermore, depending on lubrication purposes, I may treat the alkali metal reaction product with an inorganic alkaline earth metal compound in a double decomposition reaction in order to provide end products containing any of a variety of different metals.

The formation of olefin-nitrosyl halide adducts (either chloride or bromide) is disclosed in U. S. Patents 2,371,418, 2,417,675, 2,435,570, 2,485,180, 2,485,185, and in such other literature references to Tilden, J. C. S. 16 554–61 (1877) and 65 324–35 (1894), London.

I have found that certain olefinic materials are particularly suited for the preparation of my improved lubricating compositions. These are unsaturated compounds containing about 10 to 30 carbon atoms per mole and more particularly, the preferred materials are the acyclic olefins such as octadecene, tetracosene, wax-olefins generally. I prefer especially to use the branched chain olefins such as the polymers of propylene, iso-butylene, and the like which contain about 12–30 carbon atoms.

In the formation of olefin-nitrosyl chloride (or bromide) adduct starting materials, it will be best that no appreciable amounts of olefin remain unreacted. Hence the reaction should be carried out with not less than one mole of nitrosyl chloride for each mole equivalent of an olefinic double bond, reacted below 100° C. and usually below 50° C. In some cases, reaction may also require the presence of a catalyst and/or suitable solvents. These expedients are, of course, known to the art. Preparation of adducts which I have used to advantage in the practice of my invention will be found among the examples to be given hereinafter.

I have discovered that aqueous-alcoholic solutions of an alkali metal sulfide, e. g., sodium monosulfide, sodium tetrasulfide, and other polysulfides, the corresponding compounds of potassium and the like, react with the aforementioned adducts to produce products of my invention. The structure of the compounds produced by the reactions described is assumed to be such as may be represented by the following structure:

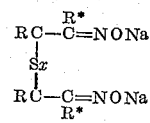

wherein R is a hydrocarbon radical, R* is either hydrogen or a hydrocarbon radical, and $x$ is a whole number corresponding to the number of atoms of sulfur present. These materials may be further converted into products containing other metals by standard double decomposition procedures.

The examples given hereinafter are not intended for limiting the invention but rather to illustrate the principles and practices to be observed in producing the new compounds and improved lubricating compositions according to my invention.

EXAMPLE I

Octadecene-1 in the amount of 126 grams (0.5 mole) was placed in a glass reaction flask equipped with a porous glass gas disperser dipping into the olefin charge, a thermometer, and a cold trap attached to each of the inlet (gas disperser) and outlet connections of the flask. Both of these traps were open to the atmosphere through their respectively attached calcium chloride drying tubes. Liquid nitrosyl chloride in the amount of 100 grams (1.53 moles) was placed in the cold trap leading to the gas disperser and its temperature was adjusted to allow vaporization of the nitrosyl chloride (boiling point—5.8° C.) at such a rate as to bubble through the olefin charge during a period of three hours. The addition reaction which then ensued was exothermic with the temperature rising to 80–90° C.; no temperature control was used other than that consequent to the rate of nitrosyl chloride introduction. The reaction mixture became emerald green in color and a white precipitate settled out.

To 50 grams of the above solid and liquid reaction product there was added 70 grams of denatured ethyl alcohol (Formula 30). Then 70 grams of an aqueous solution containing 40 per cent $Na_2S_4$ (0.16 mole) was added dropwise with stirring during 30 minutes. The temperature of the reaction rose from 26° C. to 42° C.; the mixture became brownish red in color. The reaction mixture was stirred at reflux (about 80° C.) for 2 hours after which a solution of 78 grams (0.32 mole) barium chloride in 250 ml. water was poured in. The resulting mixture was stirred with heating at 80–90° C. for 45 minutes. Aqueous and organic layers then formed on standing. The organic product layer was drawn off, dried over $CaCl_2$, and then filtered through clay. Analysis of this oil soluble product gave 1.61 per cent Ba and a base number equivalent to 10.1 mg. KOH/gram sample.

EXAMPLE II

The reaction of 126 grams (0.5 mole) octadecene-1 with 70 grams (1.07 moles) nitrosyl chloride was repeated according to Example I but with the temperature of the addition reaction being held between 25 and 35° C. by external cooling of the reaction flask. Under the modified conditions of this run, a copious amount of a white pasty precipitate formed in the reaction mixture and the liquid portion became bright blue in color.

The mixed solid and liquid adduct thus formed was reacted in an amount of 50 grams with sodium tetrasulfide followed by barium chloride as described for treatment of the adduct in Example I. Analysis of this oil soluble product gave 8.94 per cent S, and a base number equivalent to 9.22 mg. KOH/gram sample.

EXAMPLE III

A wax olefin (iodine number 114 and prepared by chlorination-dehydrochlorination of paraffin wax) was reacted in the amount of 223 grams (1.0 mole C=C) with 191 grams (2.9 moles) nitrosyl chloride, vaporized and bubbled through the olefin during about 5 hours as described in Example I. The reaction was endothermic and required external cooling to keep the temperature from rising above 45° C. The adduct product was then swept with nitrogen to remove unreacted nitrosyl chloride. A dark green adduct product was formed; electrometric titration of this adduct required 27.6 mg. KOH per gram sample for neutralization.

Thirty-five grams (about 0.12 mole estimated) of the above adduct was mixed with a solution of 15 grams 60 per cent sodium sulfide ($Na_2S$ 0.12 mole), 25 ml. water, and 25 ml. formula 30 ethyl alcohol. The mixture was stirred and its temperature rose exothermically to 63° C.; heat was then applied and the stirred mixture was kept at about 80° C. for 3 hours. The product, comprising a sodium salt, was isolated by cooling the reaction mixture and adding 200 ml. of n-pentane as a solvent. An aqueous phase formed which was discarded. The pentane-product solution was water washed 20 times; the last wash water remained slightly basic to litmus. The washed product solution was dried over calcium chloride and vacuum evaporated at 100° C. to remove the pentane. An oil soluble product was thus obtained and was found effective for the improvement of lubricating oil as further described in Example VII.

EXAMPLE IV

The wax olefin adduct of Example III in the amount of 72 grams (0.25 mole, estimated) was mixed with 50 grams denatured ethyl alcohol (Formula 30) at room temperature. Then a solution of 28.6 grams of 60 per cent sodium sulfide ($Na_2S$ 0.15 mole) in 46 ml. water was added dropwise to the adduct-alcohol solution during 10 minutes. The temperature of reaction rose to 79° C. External heating was then applied and the reaction mixture was held at about 80° C. for 4 hours, after which a solution of 59.5 grams (0.25 mole) barium chloride in 100 ml. water was poured in. This mixture was kept at about 84° C. for 5 hours. Thereafter on standing, aqueous and organic product layers formed. The aqueous layer was discarded and the oily product layer was dissolved in 500 ml. n-pentane. The pentane-product solution was washed 15 times with 100 ml. portions of water to obtain a final wash relatively free of barium ions. The washed pentane solution, after drying with calcium chloride, was evaporated at 120° C. to recover the pentane-free product. Analysis of this product gave 3.27 per cent Ba, 5.76 per cent S, and a base number equivalent to 23.34 mg. KOH/gram sample. The product is soluble in methyl ethyl ketone and in carbon tetrachloride. Oil insoluble matter was separated from the desired component of the product by clay filtering a lube oil concentrate solution of it. Its effectiveness for improving a lubricant is shown in Example VII.

EXAMPLE V

Another procedure wherein the olefin is first dissolved in a lube oil base is also effective for the preparation of the oximido-sulfide compounds and lubricating compositions of this invention.

According to this modification, 223 grams (1 mole C=C) wax olefin was mixed with 112 grams of 170 pale oil. This mixture was reacted with 156 grams (2.38 moles) nitrosyl chloride according to the procedure given in Example I, in which, however, external cooling of the reaction flask was applied to keep the reaction from rising above 42° C. The weight increase of adduct formation with the nitrosyl chloride amounted to 75 grams.

To 216 grams of the above oil-adduct mixture there was added 50 grams denatured ethyl alcohol (Formula 30). Then a solution of 28.6 grams of 60 per cent $Na_2S$ (0.15 mole) in 46 ml. water was added dropwise to the alcoholic mixture during 10 minutes. The temperature rose exothermically to 65° C., after which heating with stirring was applied and the reaction mixture held at about 80° C. for 4 hours. Then 59.5 grams (0.25 mole) $BaCl_2$ in 100 ml. water was poured in and the mixture heated at 84° C. for 5 hours. The product was separated from the accompanying aqueous phase and dissolved in 700 ml. n-pentane. The pentane solution was water washed until wash water gave only a slight test for barium. Upon evaporation of the pentane, the product weighing 166 grams was obtained. Analysis of this product gave 3.16 per cent Ba, 3.4 per cent S, and a base number equivalent to 21.33 mg. KOH/gram sample. A test showing lubrication improvement is shown in Example VII.

EXAMPLE VI

Dodecene (boiling range 350° F. to 480° F., bromine number=112) derived from polymerization of propylene in the amount of 168 grams (1.0 mole) was reacted with 196 grams of nitrosyl chloride (2.95 moles) according to the procedure of Example I with external cooling to maintain a reaction temperature of 25–35° C. The reaction mixture became emerald green in color. The weight increase of adduct formation with nitrosyl chloride amounted to 67 grams.

To 58 grams of the above oil-adduct mixture (0.25 mole, estimated) there was added 50 grams denatured ethyl alcohol (Formula 30). A solution of 28.6 grams of 60 per cent sodium sulfide ($Na_2S$ 0.15 mole) in 46 ml. of water was added dropwise to the adduct-alcohol solution during 10 minutes. The temperature of the reaction rose to 78° C. External heating was then applied and the reaction mixture was held at about 80° C. to for 4 hours, after which a solution of 59.5 grams (0.25 mole) barium chloride in 100 ml. of water was poured in. This mixture was stirred at about 85° C. for 4 hours. Upon standing, aqueous and organic product layers formed. The aqueous layer was discarded and the oily product layer was dissolved in 500 ml. n-pentane. The pentane-product solution was washed 15 times with 100 ml. portions of water. The washed pentane solution, after drying over calcium chloride, was evaporated to 120° C. to remove pentane. Analysis of this product gave 4.32 per cent Ba, 7.48 per cent S, and a base number equivalent to 31.1 mlg. KOH per gram.

EXAMPLE VII

Lubricating compositions were prepared from a 20-viscosity Midcontinuent lube oil base and metal oximido alkyl sulfides prepared according to the foregoing examples. These compounded oils were formulated to also contain a commercially available detergent of the type, calcium alkyl aromatic sufonate. Bearing corrosion tests, according to the so-called Sohio method described by Hughes and Bartleson, Anal. Chem. 21 737 (1949), were made on the various blends, the results of which are shown in Table I where comparison under same test with the base oil alone and with the base oil plus detergent can also be seen. Note from this comparison the effective inhibition of corrosion attained by the lube oil blends containing the oximido compounds of this invention.

TABLE I

*Sohio corrosion tests*

| Metal Salt Product from— | Bearing Loss Data, mg./sq. cm. | | |
|---|---|---|---|
| | Mid-Continent Lube Oil Base, 20 viscosity | Plus 1 percent detergent | Plus 3 percent oximido compound |
|  | 239.5 |  |  |
| Example III |  | 51.33 |  |
| Example IV |  |  | 0.83 |
| Example V |  |  | 0.50 |
|  |  |  | 2.00 |

I claim as my invention:

1. As a new composition of matter the compound obtained by reacting a mixture comprising an olefin-nitrosyl halide adduct, a water soluble alkali metal sulfide, alcohol, and water at a temperature of from 20 to 100° C. and for a period varying from ½ to 5 hours, then allowing the product to separate into two layers an upper organic layer and a lower aqueous layer, and then recovering and drying said organic layer to obtain the said new composition of matter.

2. As a new composition of matter the compound obtained by reacting a mixture comprising an olefin-nitrosyl halide adduct, a water soluble sodium sulfide, alcohol, and water at a temperature of from 20 to 100° C. and for a period varying from ½ to 5 hours, then allowing the product to separate into two layers an upper organic layer and a lower aqueous layer, and then recovering and drying said organic layer to obtain the said new composition of matter.

3. As a new composition of matter the compound obtained by reacting a mixture comprising an olefin-nitrosyl halide adduct, a water soluble alkali metal mono sulfide, alcohol, and water at a temperature of from 20 to 100° C. and for a period varying from ½ to 5 hours, then allowing the product to separate into two layers an upper organic layer and a lower aqueous layer, and then recovering and drying said organic layer to obtain the said new composition of matter.

4. As a new composition of matter the compound obtained by reacting a mixture comprising an olefin-nitrosyl halide adduct, a water soluble alkali metal poly sulfide, alcohol, and water at a temperature of from 20 to 100° C. and for a period varying from ½ to 5 hours, then allowing the product to separate into two layers an upper organic layer and a lower aqueous layer, and then recovering and drying said organic layer to obtain the said new composition of matter.

5. As a new composition of matter the compound obtained by reacting a mixture comprising an olefin-nitrosyl halide adduct, a water soluble alkali metal sulfide, alcohol, and water at a temperature of from 20 to 100° C. and for a period varying from ½ to 5 hours, adding water and barium chloride thereto, then allowing the product to separate into two layers an upper organic layer and a lower aqueous layer, and then recovering and drying said organic layer to obtain the said new composition of matter.

6. A composition comprising a major proportion of lubricating oil having incorporated therein .5 to 5% of the product of claim 1.

7. The composition of claim 1 characterized further in that the olefin from which said adduct was derived contained from 10 to 30 carbon atoms.

8. The composition of claim 1 characterized further in that the olefin from which said adduct was derived was a branched chain olefin containing from about 12 to 30 carbon atoms.

References Cited in the file of this patent

UNITED STATES PATENTS

| 2,354,359 | Beckham | July 25, 1944 |
| 2,394,430 | Crowder et al. | Feb. 5, 1946 |